United States Patent
Smith et al.

(10) Patent No.: US 9,168,800 B2
(45) Date of Patent: Oct. 27, 2015

(54) MULTI-CONFIGURATION, MULTI-PIN DRAWBAR RETENTION ASSEMBLY

(71) Applicant: AGCO Corporation, Hesston, KS (US)

(72) Inventors: Evan Smith, Jackson, MN (US); Matthew Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/466,527

(22) Filed: Aug. 22, 2014

(65) Prior Publication Data
US 2015/0054259 A1    Feb. 26, 2015

Related U.S. Application Data

(60) Provisional application No. 61/869,879, filed on Aug. 26, 2013.

(51) Int. Cl.
   *B60D 1/28*  (2006.01)
   *B60D 1/30*  (2006.01)
   *B60D 1/00*  (2006.01)

(52) U.S. Cl.
   CPC .. *B60D 1/28* (2013.01); *B60D 1/30* (2013.01); *B60D 2001/008* (2013.01)

(58) Field of Classification Search
   CPC ....... B60D 1/28; B60D 1/30; B60D 2001/008
   See application file for complete search history.

(56) References Cited

U.S. PATENT DOCUMENTS

| | | | | |
|---|---|---|---|---|
| 4,200,306 A * | 4/1980 | Helms | ........................... | 280/494 |
| 5,115,926 A * | 5/1992 | Kaufhold | ......................... | 213/50 |
| 5,531,283 A * | 7/1996 | Austin et al. | .................. | 180/53.1 |
| 5,997,025 A * | 12/1999 | Wisecarver | .................... | 280/508 |
| 6,003,614 A | 12/1999 | Crabb | | |
| 6,588,513 B1 | 7/2003 | Gustafson | | |
| 6,749,213 B2 | 6/2004 | Kollath et al. | | |
| 7,909,349 B2 * | 3/2011 | Rasset et al. | .................. | 280/462 |
| 2004/0056448 A1 * | 3/2004 | Kollath et al. | ................ | 280/474 |

* cited by examiner

Primary Examiner — Anne Marie Boehler
Assistant Examiner — Gabriela C Craciun

(57) ABSTRACT

A drawbar pin-retention assembly for use with a drawbar mechanism has a swinging drawbar, a support housing, and a device configured to prevent the swinging of the drawbar, the device having at least one drawbar pin. The pin-retention assembly includes a hanger bracket having a body portion and a pair of overhanging arms and a retaining bracket mounted on the hanger bracket with hinge tabs and pivotable about a pivot axis to move between a pin-retaining position and a pin-removal position. When the retaining bracket is pivoted to its pin-retaining position, a strap is positioned over the drawbar pin. Outward movement of the pin causes it to contact a forward portion of the strap forward of the pivot axis causing the retaining bracket to contact the hanger bracket thereby preventing pivoting of the retaining bracket in a first direction. The retaining bracket pivots by gravity to the pin-retention position.

5 Claims, 5 Drawing Sheets

US 9,168,800 B2

MULTI-CONFIGURATION, MULTI-PIN DRAWBAR RETENTION ASSEMBLY

CROSS REFERENCE TO RELATED APPLICATION

This application claims the benefit of U.S. Provisional Application No. 61/869,879 filed Aug. 26, 2013, which is hereby incorporated by reference in its entirety.

BACKGROUND OF THE INVENTION

1. Field of Invention

The present invention relates generally to drawbars for coupling an implement to a towing vehicle, and more particularly, to a pin retention assembly for swinging drawbars commonly used with agricultural tractors.

2. Description of Related Art

Agricultural tractors and other work machines are commonly used to tow implements behind them for various purposes, including planting, plowing and leveling. Drawbars are commonly incorporated on the back of a tractor to provide a point of attachment for the implement to the tractor. It is important to control the implement so that turning and other desired operations can be readily accomplished. Such drawbars have been designed to allow some swinging movement of the implement relative to the tractor.

At times it is desired to prevent side-to-side movement of the drawbar through the use of drawbar pins. Several devices, such as linchpins, safety clips, cotter pins, bolts, spring roll pins and other forms of latches have been used to limit the inadvertent removal of the drawbar pin. For example, a linchpin may be inserted through a portion of the drawbar pin. Although the afore-mentioned arrangement works well, the use of the linchpin has several drawbacks. First, the linchpin is a non-attached component of the drawbar pin and thus is often lost over the course of time. In agricultural applications, there are often plants and crop debris that can pull the linchpin out of the drawbar pin. Additionally, linchpins require a hole or groove to be drilled in the drawbar pin. Devices such as cotter pins, spring roll pins and bolts traditionally require tools to remove, which sometimes is not desired when quick pin removal in the field is required. In addition, there is nothing to prevent the use of the drawbar pin without the linchpin.

OVERVIEW OF THE INVENTION

In one embodiment, the invention is directed to a drawbar pin retention assembly for use with a drawbar mechanism for a work vehicle. The drawbar mechanism includes a drawbar configured for swinging motion, a support housing for supporting swing motion of the drawbar, and a device configured to prevent the swinging motion of the drawbar, the device having at least one drawbar pin received within at least one bore in the support housing. The drawbar pin retention assembly is configured to selectably prevent removal of the at least one drawbar pin. The drawbar pin retention assembly includes a hanger bracket attached to the support housing, the hanger bracket having a body portion and a pair of overhanging arms. The drawbar pin retention assembly also includes a retaining bracket mounted on the hanger bracket with hinge tabs and pivotable about a pivot axis to move between a pin-retaining position and a pin-removal position. The retaining bracket has a pin-blocking strap extending between the hinge tabs, wherein when the retaining bracket is pivoted to its pin-retaining position, the strap is positioned over the at least one pin-receiving bore and upward movement of the at least one drawbar pin causes the pin to contact a forward portion of the strap in a the contact zone that is forward of the pivot axis A causing the retaining bracket to contact the body of the hanger bracket thereby preventing pivoting of the retaining bracket in a first direction. The retaining bracket is pivotable in a second direction to the pin-removal position to position the strap rearward of the at least one bore so that the at least one pin can be inserted or withdrawn between the overhanging arms of the hanger bracket. The retaining bracket pivots by gravity to the pin-retention position.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Figure 1:
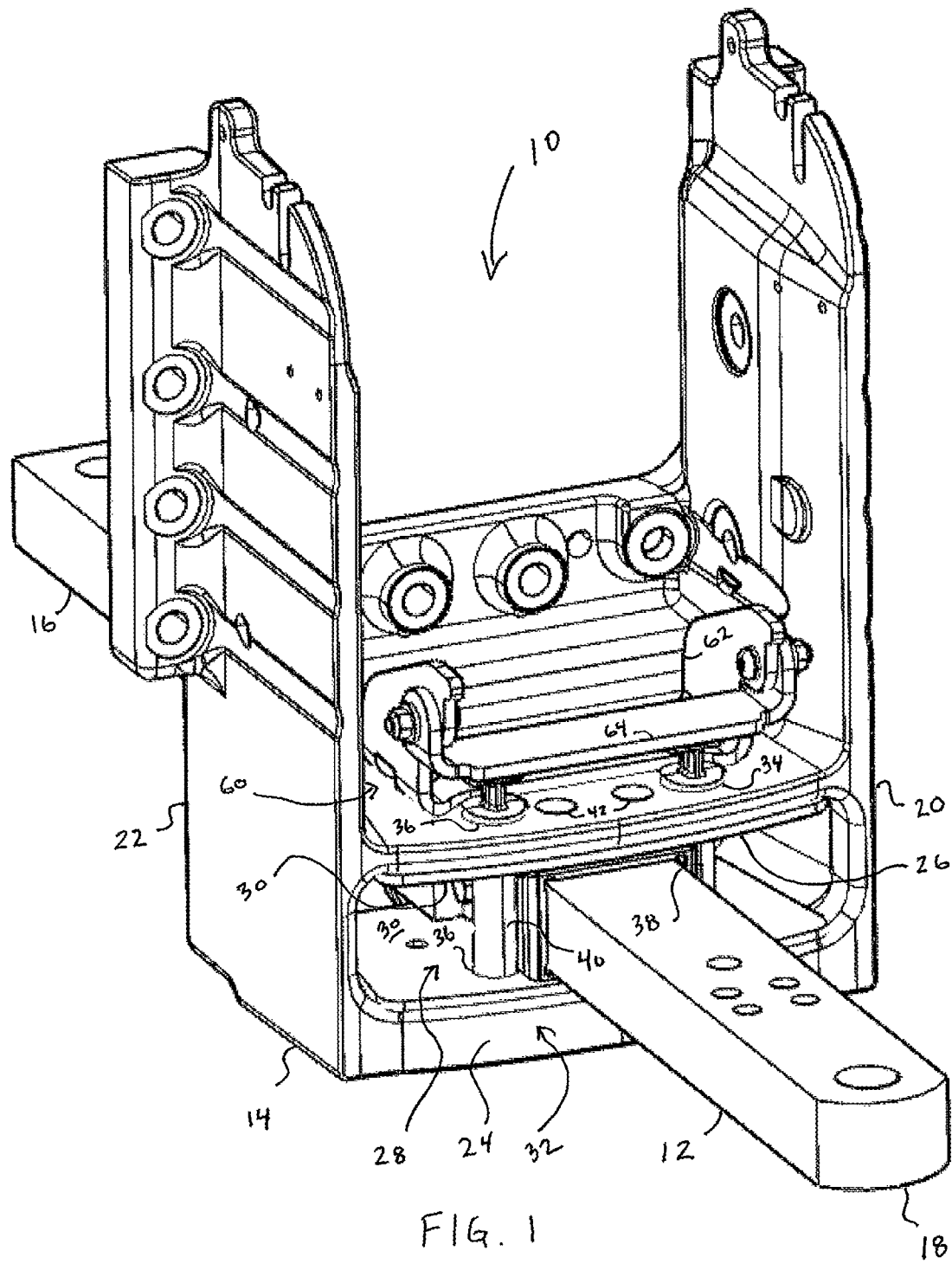
FIG. 1 shows a left rear perspective view of an example embodiment of a drawbar mechanism having a drawbar pin retention assembly.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 2:
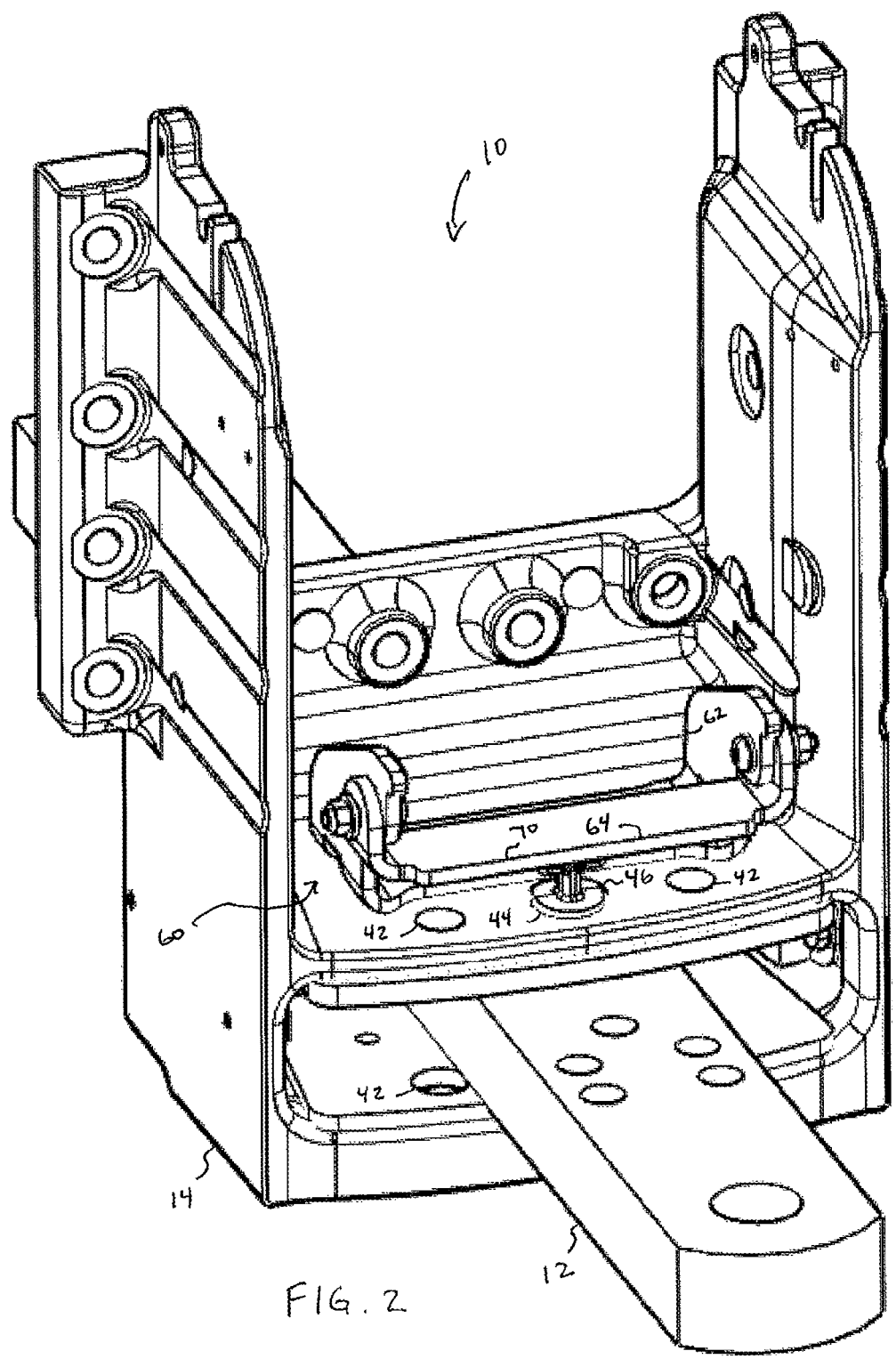
FIG. 2 shows a left rear perspective view of another example embodiment of a drawbar mechanism with an alternate pin condition having the drawbar pin retention assembly of FIG. 1.

Turning now to FIGS. 1 and 2, a drawbar mechanism 10 used to couple a towed implement to a work machine, such as an agricultural tractor, is shown. While the invention is described with reference to an agricultural tractor, it is understood that the work machine may be any type of work machine which utilizes drawbar mechanism 10. The drawbar mechanism 10 includes a swinging drawbar 12 and a support housing 14 receiving the drawbar 12. The drawbar 12 has a forward end 16 pivotally connected to the chassis of the work vehicle in a conventional fashion (not depicted) for side to side lateral movement at the rear end of the work vehicle under implement side-loads. A rearward end 18 of the drawbar 12 has a device (not shown) for coupling a tongue of a towed implement to the drawbar 12 using any known means. The support housing 14 is formed with right and left side plates 20, 22. A lower saddle 24 and an upper cover plate 26 extend between the side plates 20, 22 and define a generally rectangular opening 28 which receives the drawbar 12 and provide sufficient spacing for the drawbar 12 to be pivoted side to side under implement side-loads when desired. Wear pads 30 are desirably provided on the lower saddle 24 and the cover plate 26 to prevent wear caused by loads on the drawbar 12 from the towed implement.

Figure 3:
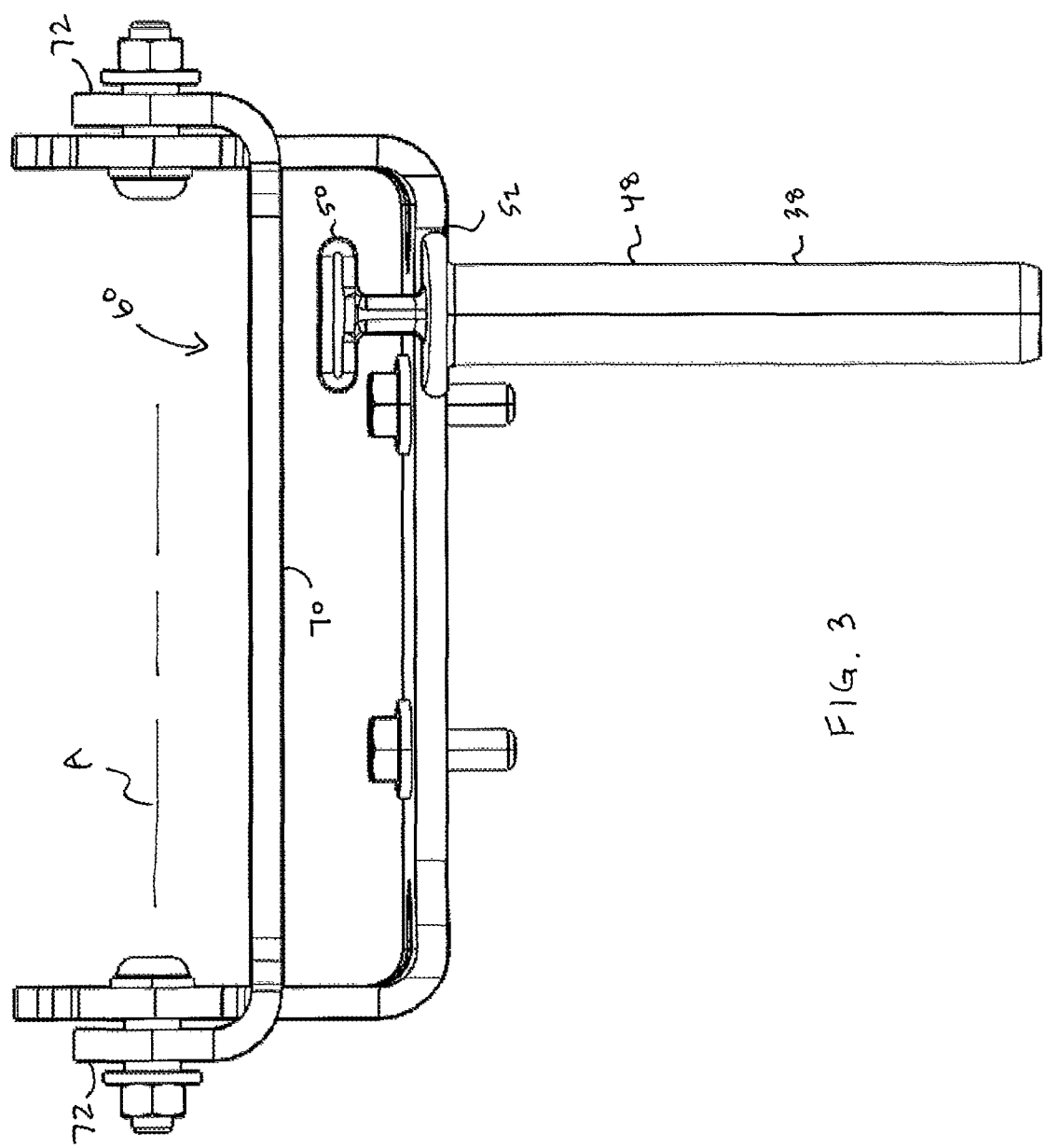
FIG. 3 shows a rear view of the drawbar pin retention assembly of FIG. 1.

The drawbar mechanism 10 also includes a system 32 for securing the swinging drawbar 12 in a stationary position. As shown in FIG. 1, a pair of vertically extending and aligned right side bores 34 is formed near the right end of the lower saddle 24 and upper cover plate 26. A pair of vertically extending and aligned left side bores 36 is formed near the left end of the lower saddle 24 and upper cover plate 26. A right drawbar pin 38 is inserted through the right side bores 34 in the lower saddle 24 and upper cover plate 26. A left drawbar pin 40 is inserted through the left side bores 36 in the lower saddle 24 and upper cover plate 26. The right and left drawbar pins engage the drawbar and prevent side to side swinging of the drawbar 12. Additional pairs of bores 42 may be arrayed across the lower saddle 24 and upper cover plate 26 as best seen in FIG. 1 to accommodate drawbars 12 of different widths. Alternately, as shown in FIG. 2, a pair of vertically aligned center bores 44 are formed in the lower saddle 24 and upper cover plate 26 and aligned with a bore (not shown) in the drawbar 12. A single center drawbar pin 46 is inserted through the bores 44 thereby coupling the drawbar 12 to the support housing 14 and preventing swinging motion. In the example embodiments shown in FIGS. 1 and 2, each drawbar pin 38, 40, 46 comprises a generally cylindrically shaped member 48 having a handle 50 at an upper end and a shoulder 52 as best seen in FIG. 3. The contact between the shoulder 52 of the drawbar pin 38 with the outer circumference of the receiving bore 34 prevents the drawbar pin 38 from falling through the bore.

Figure 4:
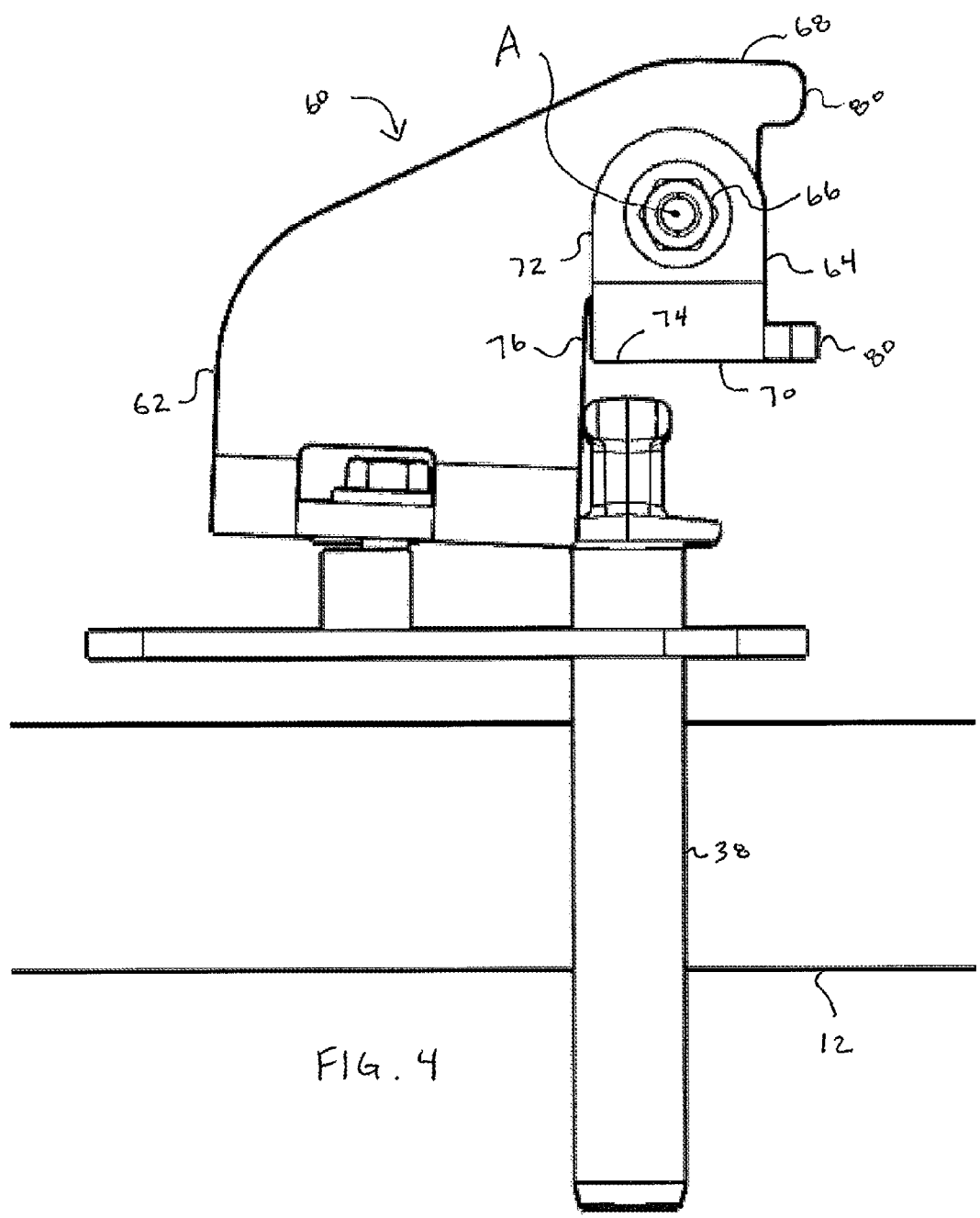
FIG. 4 shows a side view of the drawbar pin retention assembly of FIG. 1.
Figure 5:
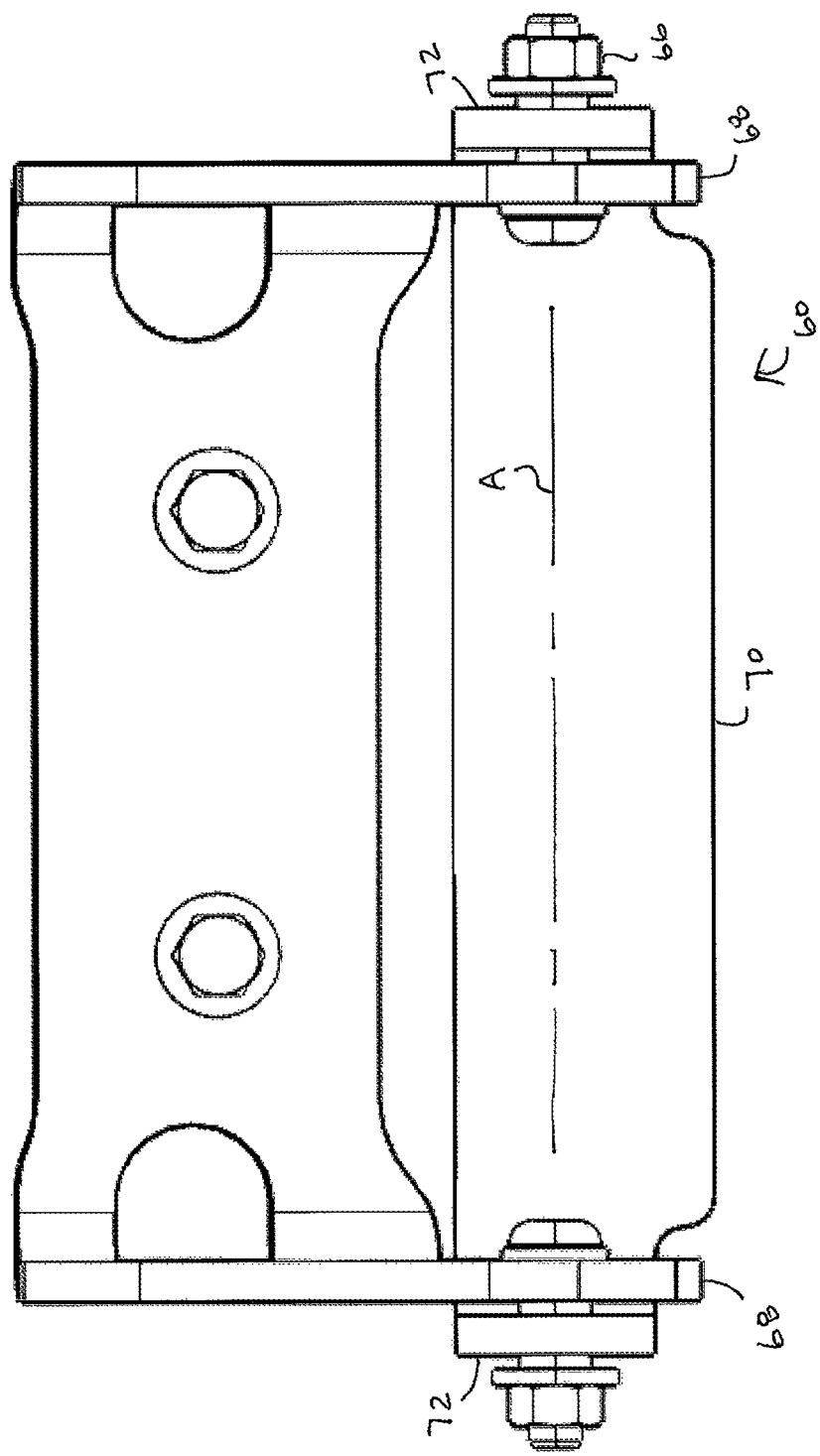
FIG. 5 is a top view of the drawbar pin retention assembly of FIG. 1.

According to the invention, the drawbar mechanism 10 also includes a pin retention assembly 60 used to retain the pin(s) used to prevent swinging motion of the drawbar 12 in their respective bores. As best seen in FIGS. 3 and 4, the pin retention assembly 60 comprises a hanger bracket 62 attached to the upper cover plate 26 and a retaining bracket 64 hinged to the hanger bracket 62 with suitable hardware 66. The retaining bracket 64 pivots on the hanger bracket 62 about pivot axis A. Both the hanger bracket 62 and retaining bracket 64 have generally U-shapes with the hanger bracket 62 forming overhanging arms 68 that receive the retaining bracket 64. The retaining bracket 64 is wider than the widest-spaced pair of pin-receiving bores 34, 36, 42 in the lower saddle 24 and upper cover plate 26. The retaining bracket 64 has a strap 70 extending between hinged tabs 72.

The retaining bracket 64 may be movably coupled to hanger bracket 62 and configured to move between a pin-retaining position condition (as shown in FIG. 1) and a pin-removal position. When the retaining bracket 64 is pivoted to its lowered retaining position, the strap 70 is generally parallel with the lower saddle 24 and is positioned over the pin-receiving bores 34, 36, 42, 44. Any upward movement of a drawbar pin 38, 40, 46 would cause the pin to contact a forward portion 74 of the strap 70. As best seen in FIG. 4, the contact zone of the pin 38 with the strap 70 is forward of the pivot axis A on the overhanging arms 68 of the hanger bracket 62 and engagement of the retaining bracket 64 with body 76 of the hanger bracket 62 prevents further pivoting of the retaining bracket 64 in the clockwise direction. Thus, the strap 70 prevents withdrawal of the pin 38.

In order to withdraw the pin 38, the retaining bracket 64 is pivoted counter-clockwise about 90 degrees to a pin-removal position so that the strap 70 is generally perpendicular with the upper cover plate 26. In this position, the strap 70 is rearward of the bores 34, 36, 42, 44 and the pins 38, 40, 46 can be inserted or withdrawn between the overhanging arms 68 of the hanger bracket 62. The hanger bracket 62 and retaining bracket 64 are shaped with contact points 80 that prevent the retaining bracket 64 from more than about 90 degrees of rotation such that when the operator releases the retaining bracket 64 after inserting the pins, the retaining bracket 64 pivots downward or clockwise under the force of gravity to automatically lock the pins in place. Thus, the pin retention assembly 60 is biased into a condition that retains the pins in the bores.

As seen in FIGS. 1 and 2, the pin retention assembly 60 can be used with any pin configuration by the system 32 to secure swinging movement of the drawbar 12 and with different categories of drawbar 12. The strap 70 of the retaining bracket 64 is sufficiently sized such that it covers all possible pin-receiving bores in the upper cover plate 26. Additionally, as can be seen, operation of the pin retention assembly 60 requires no removable parts that can become lost causing the function of the pin retention assembly 60 to be compromised.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A drawbar mechanism for a work vehicle comprising:
a drawbar configured for swinging motion;
a support housing for supporting swinging motion of the drawbar;
a device configured to prevent the swinging motion of the drawbar, said device comprising at least one drawbar pin received within at least one bore in the support housing;
a drawbar pin retention assembly configured to selectably prevent removal of the at least one drawbar pin, the drawbar pin retention assembly comprising:
 a hanger bracket attached to the support housing, the hanger bracket having a body portion and a pair of overhanging arms;
 a retaining bracket mounted on the hanger bracket with hinge tabs and pivotable about a pivot axis to move between a pin-retaining position and a pin-removal position, the retaining bracket having a pin-blocking strap extending between the hinge tabs, wherein when the retaining bracket is pivoted to its pin-retaining position, the strap is positioned over the at least one pin-receiving bore and upward movement of the at least one drawbar pin causes the pin to contact a forward portion of the strap in a contact zone that is forward of the pivot axis causing the retaining bracket to contact the body of the hanger bracket thereby preventing pivoting of the retaining bracket in a first direction, and wherein the retaining bracket is pivotable in a second direction to a pin-removal position to position the strap rearward of the at least one bore so that the at least one pin can be inserted or withdrawn between the overhanging arms of the hanger bracket, and wherein the retaining bracket pivots by gravity to the pin-retention position.

2. The drawbar mechanism of claim 1 wherein the support housing has multiple pin-receiving bores such that the device can be used to secure drawbars having different widths, with different bores designed to be used with different drawbar widths, and the strap of the retaining bracket is sized such that it covers all the multiple pin-receiving bores.

3. The drawbar mechanism of claim 1 wherein the hanger bracket and retaining bracket are shaped with contact points such that when the contact points prevent further movement of the retaining bracket in the second direction, gravity forces the retaining bracket to pivot back in the first direction to return the retaining bracket to the pin-retaining position.

4. The drawbar mechanism of claim 1 wherein the hanger bracket and retaining bracket are shaped with contact points that prevent the retaining bracket from pivoting more than about 90 degrees in the second direction of rotation such that retaining bracket pivots in the first direction under the force of gravity to automatically lock the pins in place.

5. The drawbar mechanism of claim 1 wherein the hanger bracket and retaining bracket have U-shapes.

\* \* \* \* \*